P. McPHERSON.
SLICER.
APPLICATION FILED APR. 8, 1914.
1,128,479.
Patented Feb. 16, 1915.
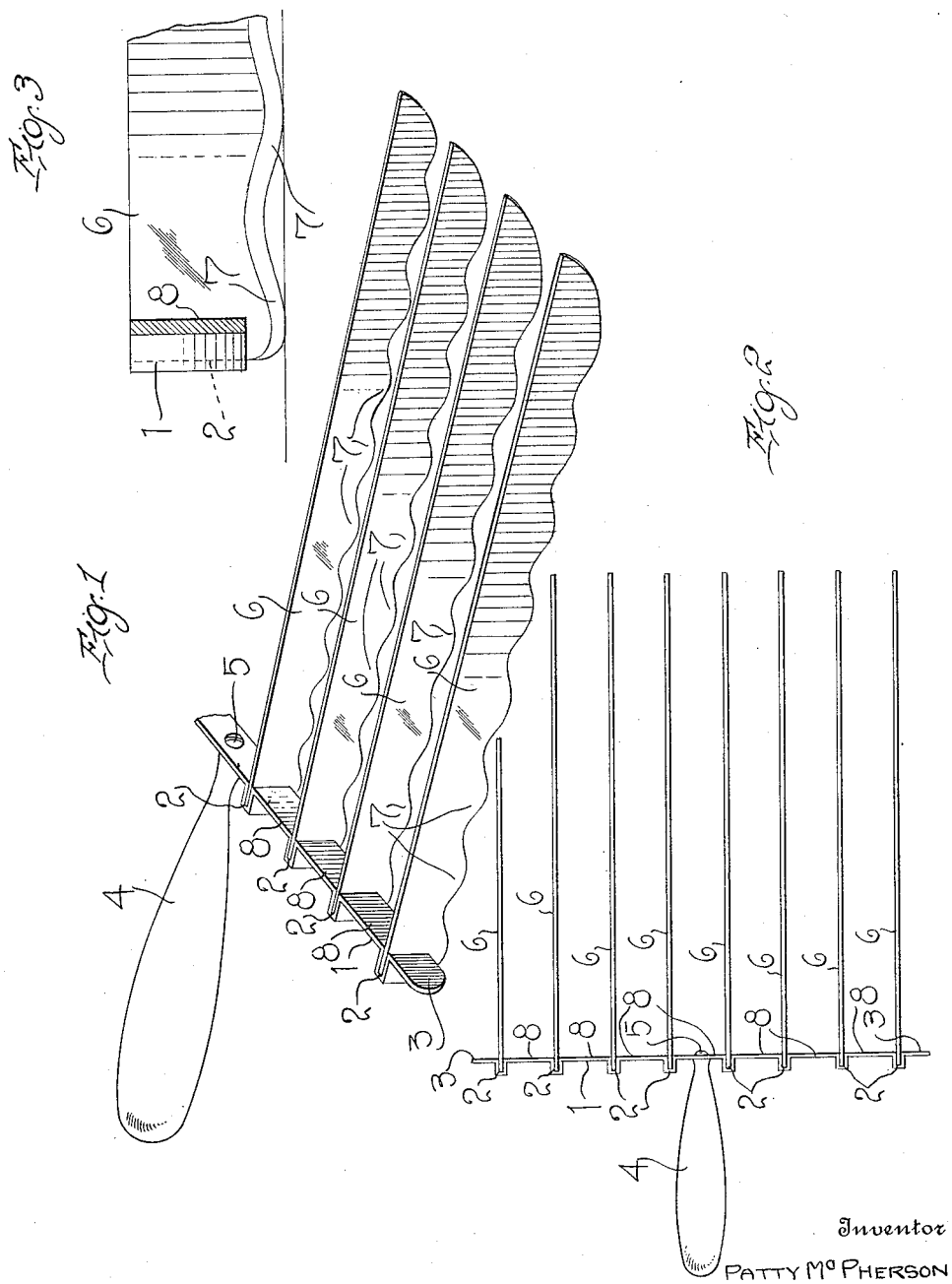
Inventor
PATTY McPHERSON
Witnesses
By Watson E. Coleman
Attorney

UNITED STATES PATENT OFFICE.

PATTY McPHERSON, OF BOERNE, TEXAS.

SLICER.

1,128,479.  Specification of Letters Patent.  Patented Feb. 16, 1915.

Application filed April 8, 1914. Serial No. 830,458.

*To all whom it may concern:*

Be it known that I, PATTY McPHERSON, a citizen of the United States, residing at Boerne, in the county of Kendall and State of Texas, have invented certain new and useful Improvements in Slicers, of which the following is a specification, reference being had to the accompanying drawings.

This invention relates to new and useful improvements in slicers or cutters for kitchen use and more particularly to a device for cutting bread, meats, vegetables and the like, the main object of the invention being the provision of a plurality of parallel blades which are secured to a stock or handle so that the entire cutting edges thereof will be arranged beneath the stock or handle and can be readily used for cutting bread, meats and vegetables.

Another object of the present invention is the provision of a cutting or slicing device of this character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a detail perspective view of a portion of a slicer constructed in accordance with my invention. Fig. 2 is a top plan view; and Fig. 3 is a detail side elevation of one of the blades, illustrating the manner of mounting the same.

Referring more particularly to the drawing, 1 indicates a retaining plate which is crimped or bent upon itself at various intervals to provide the spaced U-shaped and forwardly opening retaining recesses or sockets 2 open from top to bottom and provided at its ends with the outstanding portions 3. Secured to the bar 1 at the middle thereof, is a handle member 4, the inner end of said handle being arranged between the recessed portions and held in position by means of the screw bolt 5, whereby the handle may be readily removed from the cutter, when it is desired to pack the same for shipping.

The blades which are indicated by the numeral 6, are arranged in spaced parallel relation and the inner ends thereof are arranged within the recesses 2 and soldered or otherwise secured in position.

It will be noted from the accompanying drawing, that the blades extend into the recesses 2 about one-half the width thereof, so that the entire cutting edges of the blades will be disposed below and rearwardly of the plate 1. The cutting edges of the blades are undulating, as shown.

It will be noticed that by having the ends of the blades extending into the recesses 2, the longitudinally alined portions 8, between the blades will securely retain said blades against any lateral movement and also tend to stiffen the blades and prevent too much resilient movement on the part of the blades, so that the bread, meats and vegetables which are to be cut, may be cut evenly.

It will be observed that by having the sockets 2 disposed rearwardly of the bar 1, the cutting edges 7 of the blades 6 are disposed rearwardly of the bar 1 and that the heel portions thereof are rounded, as particularly shown in detail Fig. 3, whereby it will be perceived that the desired cutting operation may be effected with greater convenience and facility.

From the foregoing description taken in connection with the accompanying drawing, it will be readily apparent that I have provided a simple and durable slicing tool wherein the blades are rigidly mounted at their inner ends within the recessed longitudinal bar and so arranged that the entire cutting edges of the blades are disposed entirely beneath the supporting bar. It will also be apparent that when it is desired to ship a number of these cutting knives, the handles 4 may be readily removed so that the cutters will occupy a minimum space. It will also be apparent that my improved cutting device is extremely simple in construction and can be manufactured at a comparatively small cost.

Having thus described this invention, what I claim is:—

A slicer comprising a retaining bar provided with a rearwardly disposed socket, a handle member secured to said bar at one side of said socket and a cutting blade secured in said socket at one end whereby a portion of said blade is disposed rearwardly of the bar, the blade being of a width greater than the width of the bar, the heel portion thereof projecting below the bar being rounded and being provided with a cutting edge.

In testimony whereof I hereunto affix my signature in the presence of two witnesses.

PATTY McPHERSON.

Witnesses:
ELLEN H. SCHATTENBERG,
WM. KUHLMANN.

Copies of this patent may be obtained for five cents each, by addressing the "Commissioner of Patents, Washington, D. C."